United States Patent [19]

Maciejewski

[11] 4,235,317

[45] Nov. 25, 1980

[54] APPARATUS FOR ABSORBING MECHANICAL ENERGY IN PARTICULAR ENERGY OF VERY STRONG SHOCKS

[76] Inventor: Jeremi Maciejewski, Al. Niepodleglosci Str., 142⁴,, Warsaw, Poland

[21] Appl. No.: 904,501

[22] Filed: May 10, 1978

[30] Foreign Application Priority Data

May 10, 1977 [PL] Poland ................................. 198005

[51] Int. Cl.³ ............................................. F16F 9/30
[52] U.S. Cl. ................................. 188/268; 188/269; 188/297; 188/322; 267/152; 293/134; 293/136
[58] Field of Search .............. 267/115, 116, 138, 139, 267/124, 128, 152; 188/268, 269, 297, 322, 284; 293/134, 136

[56] References Cited

U.S. PATENT DOCUMENTS

| | | | |
|---|---|---|---|
| 2,503,143 | 4/1950 | Wasdell | 188/268 |
| 3,241,642 | 3/1966 | King | 188/268 X |
| 3,784,179 | 1/1974 | Sugiura | 188/268 X |
| 3,877,552 | 4/1975 | Higginson et al. | 188/268 |
| 4,085,832 | 4/1978 | Gaines et al. | 188/268 |

FOREIGN PATENT DOCUMENTS

| | | | |
|---|---|---|---|
| 1152579 | 8/1963 | Fed. Rep. of Germany | 267/65 R |
| 1372781 | 8/1964 | France | 267/35 |
| 73176 | 4/1975 | Poland . | |
| 668926 | 3/1952 | United Kingdom | 188/284 |

OTHER PUBLICATIONS

Spooner, Laurence W. Silicone Putty as an Engineering Material, Product Engineering, Jan. 1950, pp. 90-93.

*Primary Examiner*—George E. A. Halvosa

[57] ABSTRACT

A shock absorber comprising telescopically inserted cylinders, the empty space between them being filled with a medium of appropriately selected rheological properties of increasing viscosity, decreasing elasticity and one of which being filled with a media having viscous characteristics under static conditions and elastic characteristics under dynamic conditions.

4 Claims, 1 Drawing Figure

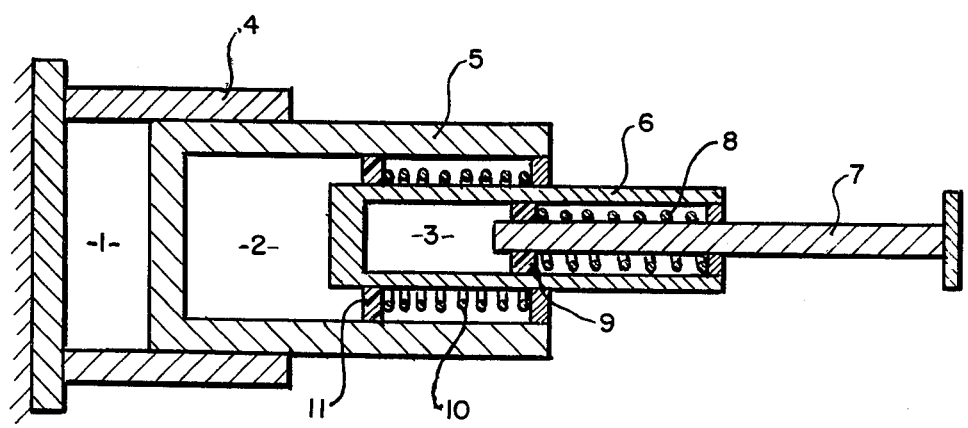

APPARATUS FOR ABSORBING MECHANICAL ENERGY IN PARTICULAR ENERGY OF VERY STRONG SHOCKS

BACKGROUND OF THE INVENTION

The object of this invention is to provide apparatus for absorbing mechanical energy, in particular energy of very strong shocks. Such an apparatus is used for absorbing the energy of shocks in the rail and automotive vehicles, in the construction of cannons and rocket launches, etc., as a bump stop in elevators, travelling cranes, lifts and other mobile apparatuses and machine parts as well as a damper of vibrations arising during the travel of vehicles, running of machines and devices.

The apparatus of this invention is designed so as to perform simultaneously two or more of the above mentioned functions, e.g., absorb strong shock, damp vibration, and effect stoppage of moving vehicles.

The hitherto known apparatuses for absorbing memechanical energy are characterized by the fact that they have an exactly defined field of application at a strictly defined level of absorbed energy. When these levels of absorbed energy are exceeded, they do not carry out their function and become destroyed. At lower levels of absorbed energy they exhibit properties of an elastic solid and transmit the acting forces to the device onto which they are mounted. Due to these circumstances the hitherto known absorbers of the energy of shocks are not apt to fulfil simultaneously the function of a vibration damper or the function of an absorber of energy of shocks. Moreover, the hitherto known solutions of the problem have the drawback, in that a considerable change in their characteristics occurs due to changes in the ambient temperature or to an increase in the temperature of the absorber itself caused by the conversion of the absorbed energy into heat. At temperatures below $-30°$ C. absorbers lose their properties due to the solidification of the fluids or greases, whereas at temperatures above $+30°$ C. the viscosity of fluids and greases is lowered, which results in a decrease in the energy absorption capacity of the absorber.

In the hitherto known shock absorbing apparatuses the mechanical energy is absorbed by sets of steel springs, or pads made of vulcanized organic rubbers, while the vibration damping is accomplished by liquid media such as aliphatic alcohols, glycols, mineral and silicone oils, or various pastes based on resins, oils and mineral fillers.

For example, the absorber of very strong shocks, as described in the Polish patent specification No. 73,176, which is designed for rail vehicles, comprises two coaxial cylinders and a third cylinder which is being pushed between those two cylinders and which ends in an ellipsoidal ring of diameter greater than the distance between the coaxial cylinders. The shock energy is absorbed due to the deformation of the coaxial cylinders and to the friction of the ring. At lower shock energies this apparatus behaves as a rigid body, whereas at shock energies exceeding the permitted value the absorber is destroyed. Moreover, this absorber does not damp vibrations. The vibration damper, as described in the Polish patent specification No. 69,315, comprises two rings separated by an elastic pad. This apparatus is apt to damp vibrations, whereas the shock energy deforms the elastic pad which results in the necessity of replacing it.

The vibroisolators, as described in the Polish patent specification No. 83,615 with a viscotic vibration damper, comprise a cylinder and a plunger with a highly viscous liquid such as paraffin or silicone oil placed between them. This damper does not absorb shock energy, and at a higher amplitude and frequency of vibrations, the degree of damping is considerably lowered, in particular when using silicone oil as the damping medium.

The above-described hitherto known shock energy absorbers or vibration dampers fulfil only one strictly defined function and they are designed for strictly defined working conditions. Any deviations from these conditions result in the necessity for changing their design, applying other media for damping vibrations and absorbing the shock energy. A continuous transition from the function of an vibration damper to the function of a bump stop, and, further, to the function of a shock energy absorber is impossible of attainment in these hitherto known apparatuses. Moreover, in the hitherto known apparatuses it is impossible to obtain an increase in the energy absorptivity with an increase in the energy supplied for strong shocks repeating in short intervals of time and for vibrations with varying amplitude.

The apparatus according to the present invention is devoid of all these functional drawbacks and it can fulful simultaneously the function of a damper for vibrations with varying amplitudes and frequencies, of a bump stop, and of a shock energy absorber with its absorptivity increasing with the increase in the amount of energy supplied.

The combination of all the above mentioned functions and a continuous transition from one function to another is obtained in the apparatus according to the present invention due to the elaboration of an appropriate design of this apparatus and to the application of a viscoelastic medium with appropriately selected rheological properties as energy absorbing medium.

SUMMARY OF THE INVENTION

The apparatus according to the present invention comprises an immobile cylindrical part and a mobile part which is inserted into the immobile part. The mobile part comprises at least one mobile cylinder with a bottom, advantageously two mobile cylinders, one of them being inserted into another, and a mobile plunger being inserted into the last cylinder. The empty space enclosed between the immobile cylinder and the first mobile cylinder, as well as in succession between the mobile cylinders and between the last mobile cylinder and the plunger is filled with a medium absorbing the shock energy and the vibration energy with a successively decreasing elasticity in the direction from the immobile cylinder to the plunger and with an increasing share of viscous properties, the medium of at least one of the cylinders being a substance characterized by a viscous flow under static conditions and by high elasticity under dynamic conditions. The empty space of the immobile part of the absorber is filled with a medium characterized by predominantly elastic properties, and the empty spaces of the mobile part with a substance with predominantly viscous properties, in particular with polysiloxane polymers.

The ratio of the diameters: external diameter of the first mobile cylinder to the internal diameter of the immobile cylinder and to the diameters of the further cylinders being inserted one into another is from 0.001 to 0.999.

The ratio of the volumes of the successive chambers between cylinders and between the last cylinder and plunger is from 0.001 to 1000. In the case when the number of cylinders is higher than two, the immobile cylinder is filled with a medium with predominant elastic properties, and the last cylinder into which the shock-bearing plunger is inserted, is filled with a medium with predominant viscous properties of viscosity higher than 1000 cP(centipose).

BRIEF DESCRIPTION OF DRAWING

The FIGURE is a diagrammatic cross-section of a three-cylinder apparatus embodying the present invention.

DESCRIPTION OF THE INVENTION

Into a cylinder 4, filled with an elastic polymer 1, there is inserted cylinder 5 filled with a viscoelastic polymer 2. The polymer 2 is viscous under static conditions and elastic under dynamic conditions. This polymer is kept in stressed state by the gasket 11 pressed down by spring 10. Into cylinder 5 there is inserted a cylinder 6, into which cylinder enters plunger 7. In cylinder 6 a viscous polymer 3 is placed which is being kept in a stressed state by gasket 9 pressed down by a spring 8.

Cylinders 4, 5, and 6 are made of a low-carbon, preferably chromium-plated steel, and plunger 7 is made of constructional steel. The most preferable gaskets 9 and 11 are made of polytetrafluoroethylene. Springs 8 and 10 are made of steel and they should warrant the lowest permanent deformation during many-years exploitation of the apparatus.

In the case of low-amplitude vibrations plunger 7 is being pushed into the viscous polymer 3 which brakes its movement. Due to this medium the plunger is pushed with a decreasing frequency which results in a gradual extinction of the vibrational sinusoid. The high-amplitude vibrations are damped by the set of cylinders 5 and 6.

In the event that the apparatus is to function as a bump stop, a part of the shock energy is instantaneously taken over first by polymer 2 and then absorbed fully by polymer 3, whereas in the final phase of braking the cylinder 6 is pushed into polymer 2.

In the case where there is a considerable increase in the weight of the construction to be braked/e.g. a loaded travelling crane/, plunger 7 comes to rest on the bottom of cylinder 6, pushing it into cylinder 5, and in its final stage of movement the whole set comes to rest on polymer 1.

In the case of a very heavy shock, the inertia of the whole apparatus causes the taking over of the energy first by polymer 2, which behaves as an elastic body, then by polymer 1, and then again by polymer 2 acting as a body of decreasing elasticity and increasing viscosity as the energy is being absorbed. Next, polymer 3 functions as a bump stop due to immersion of plunger 7 into it.

In the case of a violent shock with an energy many times higher than the assumed normal one, the shock is taken over by polymer 2 which causes its tearing into small fragments, then by polymer 1, and then by polymer 2 again, the structure of which has already been restored and which starts working as a viscous substance. The cylinders return to their initial position during a dozen or so seconds after shock had occurred.

I claim:

1. Apparatus for absorbing high and low energy vibrations and shocks comprising at least two cylinders of decreasing diameter, each closed at one end arranged telescopically one within the other to define therebetween a series of chambers each enclosed by the next succeeding cylinder, the largest of said cylinders being immobile and the remaining cylinders being movable relative to each other, the smallest cylinder having an externally engagable plunger means movably mounted therein and having means for defining therewith an enclosed chamber, each of said enclosed chambers being filled with a medium capable of absorbing both energy vibration and shock, spring means acting on a portion of said plunger means to place said medium in said chamber of the smallest cylinder under stressed condition, the elasticity of the medium decreasing and the viscosity of the medium increasing successively from the largest chamber to the smallest chamber, at least one of said chambers being filled with a polysiloxane having a viscous flow under static conditions and a high elasticity under dynamic conditions.

2. The apparaus according to claim 1 wherein the cylinder having the plunger means located therein is filled with a medium having a viscosity greater than 1000 centipoises.

3. Apparatus, as claimed in claim 1, characterized by the fact, that the ratio of the diameters: external diameter of the first mobile cylinder to the internal diameter of the immobile cylinder and to the diameters of the further cylinders being inserted one into another is from 0.001 to 0.999.

4. Apparatus, as claimed in claim 1, characterized by the fact that the ratio of the volumes of the chambers filled with the medium between the successive cylinders and the last cylinder and plunger is from 0.001 to 1000.

* * * * *